Aug. 6, 1940.   H. K. PERRILL   2,210,632

GOLF BAG CARRIER

Filed Feb. 23, 1939

INVENTOR.
Harlan Knox Perrill
BY
A. B. Bowman
ATTORNEY.

Patented Aug. 6, 1940

2,210,632

UNITED STATES PATENT OFFICE 2,210,632

GOLF BAG CARRIER

Harlan Knox Perrill, San Diego, Calif.

Application February 23, 1938, Serial No. 192,150

1 Claim. (Cl. 280—53)

Figure 1:
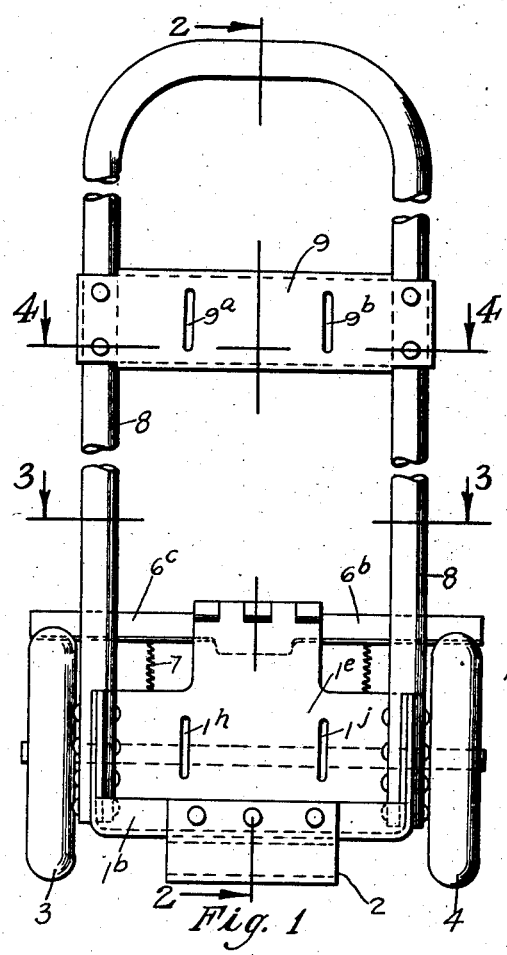
Figure 2:
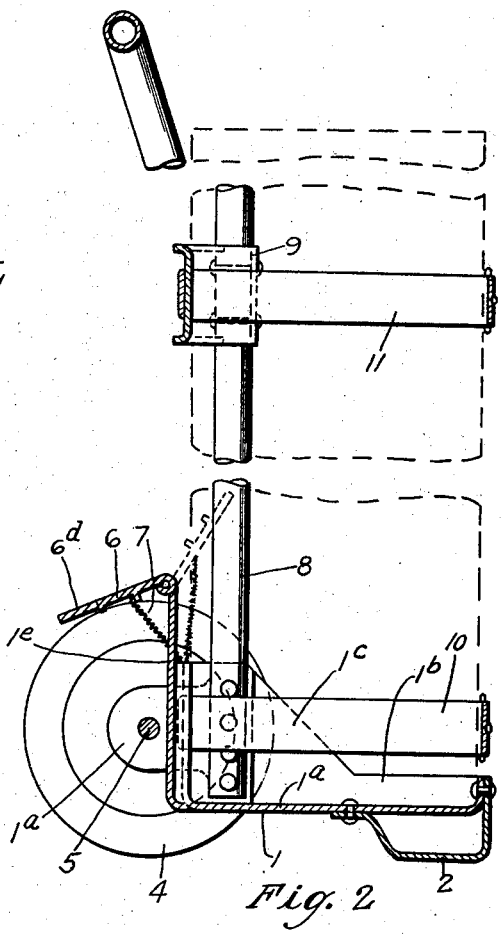
Figure 3:
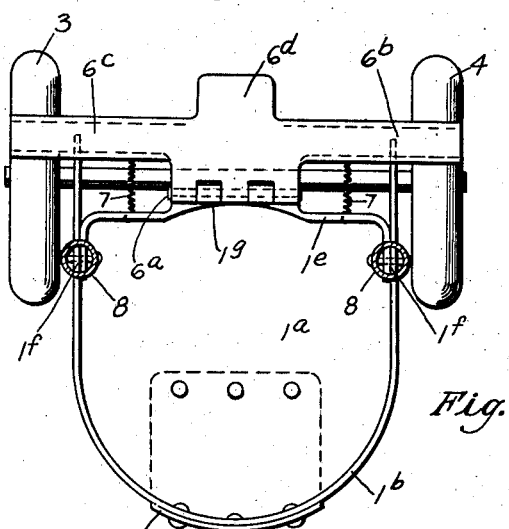
Figure 4:
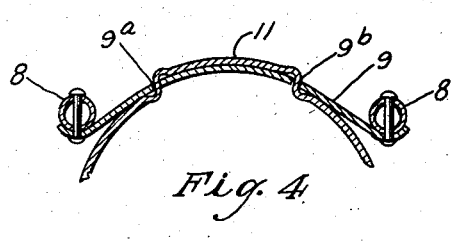

My invention relates to a carrier for golf bags adapted to facilitate the handling of the golf bag along the golf course and the objects of my invention are:

First, to provide a small, light, hand truck adapted to carry one or two golf bags on the golf course;

Second, to provide a carrier of this class which may be set upon end with the bag secured thereto so that it is in an upright position for selecting the clubs therefrom;

Third, to provide a carrier of this class with brake means for holding it in proper location when on sloping or uneven ground;

Fourth, to provide a carrier of this class which is light enough to be carried with the bag over rough ground if desired;

Fifth, to provide a carrier of this class with means for quickly attaching and detaching the golf bag therewith;

Sixth, to provide a carrier of this class which is relatively light and sturdy of construction;

Seventh, to provide a carrier of this class which is very simple and economical of construction, efficient in its action and which will not readily deteriorate or get out of order;

With these and other objects in view as will appear hereinafter my invention consists of certain novel features of construction, combination, and arrangement of parts and portions as will be hereinafter described in detail and particularly set forth in the appended claims, reference being had to the accompanying drawing and to the characters of reference thereon which form a part of this application in which:

Figure 1 is a front elevational view of my carrier shown fragmentarily in upright position; Fig. 2 is a sectional view taken from the line 2—2 of Fig. 1 and showing the golf bag positioned thereon in dash lines and showing the inoperative position of the brake in dash lines; Fig. 3 is a sectional view taken from the line 3—3 of Fig. 1; Fig. 4 a sectional view taken from the line 4—4 of Fig. 1.

Similar characters of reference refer to similar parts and portions throughout the several views of the drawing:

The base member 1, base support member 2, wheels 3 and 4, axle 5, brake member 6, brake springs 7, handle and frame 8, upper bag support 9, and bag supporting straps 10 and 11 constitute the principal parts and portions of my golf bag carrier.

The base member 1 includes a substantially flat plate portion 1a which is provided with a flange 1b extending substantially on three sides thereof. This flange 1b, however, is widened at 1c on opposite sides and this widened portion 1c is secured in position in slots in the extended end of the handle member 8 as shown best in Fig. 2 of the drawing. This portion 1c is, however, extended by means of extended lug portions 1d on opposite sides which form supports in which the axle 5 is mounted and on the extended ends of this axle 5 are secured the wheels 3 and 4 which are preferably pneumatic tire wheels to provide a cushion for the carrier. The portion 1a at its normally back side is extended at right angles substantially parallel with the handle 8, which back portion is designated 1e and it is provided at its sides with flange portions 1f which are also inserted in the slots 8a in the extended ends of the handle member 8 and rigidly secured in said slots together with the portion 1c, thus rigidly tying the base member with the handles and the support for the axles and wheels in rigid relation with each other.

It will be here noted that the portion 1b is provided with a slightly concave portion 1e at its middle portion adapted to receive the rounded side of the lower end of the golf bag when the lower end is positioned on the base with its end resting on the portion 1a of said base.

Pivotally connected to the normally upper edge of the portion 1e by means of a pin 6a is the brake member 6 which is provided with extended ends 6b and 6c which are adapted to engage the periphery of the wheels 3 and 4 when in certain positions for providing a brake to prevent the wheels turning. This brake member 6 is provided with a pair of springs 7 connected thereto at one of their ends intermediate the sides of the brake member 6 and their opposite ends are secured to the upper edge of the member 1e. These springs are tension springs and are positioned so that they operate as over center spring so that the brake is held by the spring against the periphery of the wheels 3 and 4 when in one position, but may be tilted over the center and the springs then tend to hold the brake member against the handle member 8 as shown by solid and dotted lines in Fig. 2 of the drawing. This brake member 6 is provided with an extended portion at its middle and back sides designated 6d which is adapted to be engaged by the foot of the operator for shifting the brake to either its operative or inoperative position. The portion 1e is provided with two slots 1h and 1j in which is mounted a strap 10 which passes through these slots 1h and 1j and around the golf bag as shown best in Fig. 2 of the drawing and they are buckled together in conventional manner at the front side of the golf bag.

The handle member 8 is a double U-shaped member in the form of a tube and slotted at their extended ends with slots 8a as hereinbefore described. The extended portion of the handle is set backwardly on an angle from the other portion as shown best in Fig. 2 of the drawing. Mounted on this handle member 8 is the upper bag support 9 which is preferably a channel member and is provided with a curve between the handles as shown best in Fig. 4 of the drawing for receiving the golf bag at one side and it is secured to the handles at its opposite end and forms a brace for the handle member as well as a support for the upper end of the bag. This support 9 is also provided with slots 9a and 9b to which is mounted a strap which extends around the bag and is buckled at the front side similar to the strap 10, said strap being designated 11, shown best in Fig. 2 of the drawing.

The operation of my golf bag carrier is substantially as follows:

The bag is secured in position on the carrier by the straps 10 and 11 as shown best in Fig. 2 of the drawing with the lower end of the bag resting on the portion 1a of the base member 1 with the brake turned back against the handle as shown in dotted line position in Fig. 2 of the drawing. The bag, together with its load is wheeled on the tires 3 and 4 over the course to the places desired for its use, the wheels having relatively large rubber tires, they do not sink into the turf. If it is desired to stop on sloping ground, the carrier may be laid down with the handle resting on the ground and the brake member 6 turned downwardly in engagement with the wheels as shown by solid line in Fig. 2 of the drawing or the brake may be applied and the carrier and bag positioned substantially perpendicular or upright if the ground is not too sloped. In particularly rough ground where the wheeling of the carriage is impractical, the carriage, together with the bag, may be carried over such rough territory either by holding it by the handle of the carriage or the shoulder strap of the golf bag.

Though I have shown and described a particular construction, combination and arrangement of parts and portions, I do not wish to be limited to this particular construction, combination, and arrangement, but desire to include in the scope of my invention the construction, combination, and arrangement substantially as set forth in the appended claim.

Having thus described my invention, what I claim as new and desire to secure by Letters Patent is:

In a golf bag carrier of the class described, the combination of a base member provided with an upwardly extending ledge arranged to receive the end of a golf bag, the back portion of said ledge being substantially straight and considerably higher than the front portion, a double member handle secured to the wide portion of said ledge at the back side thereof by means of slots in the ends of said handle extending over the wide portion of said ledge, an axle supported on the back side of the wide portion of said ledge and wheels mounted on said axle outwardly of said ledge.

HARLAN KNOX PERRILL.